US010176483B2

(12) United States Patent
Vadon

(10) Patent No.: US 10,176,483 B2
(45) Date of Patent: Jan. 8, 2019

(54) USER INTERFACE FOR DISPLAYING PURCHASE CONCENTRATION DATA FOR UNIQUE ITEMS BASED ON CONSUMER-SPECIFIED CONSTRAINTS

(75) Inventor: Mark C. Vadon, Seattle, WA (US)

(73) Assignee: Blue Nile, Inc., Seattle, WA (US)

( * ) Notice: Subject to any disclaimer, the term of this patent is extended or adjusted under 35 U.S.C. 154(b) by 989 days.

(21) Appl. No.: 12/341,900

(22) Filed: Dec. 22, 2008

(65) Prior Publication Data

US 2009/0299877 A1   Dec. 3, 2009

Related U.S. Application Data

(60) Provisional application No. 61/016,415, filed on Dec. 21, 2007.

(51) Int. Cl.
  G06Q 30/02        (2012.01)
  G06Q 30/06        (2012.01)
  G06F 17/30        (2006.01)

(52) U.S. Cl.
  CPC ....... *G06Q 30/02* (2013.01); *G06F 17/30572* (2013.01); *G06Q 30/0601* (2013.01)

(58) Field of Classification Search
  CPC .............. G06Q 30/02; G06Q 30/0601; G06F 17/30572
  See application file for complete search history.

(56) References Cited

U.S. PATENT DOCUMENTS

| | | | | |
|---|---|---|---|---|
| 5,950,178 A | * | 9/1999 | Borgato | 705/37 |
| 2002/0133417 A1 | * | 9/2002 | Hanks et al. | 705/26 |
| 2002/0147630 A1 | * | 10/2002 | Rose et al. | 705/10 |
| 2007/0198494 A1 | | 8/2007 | Vadon et al. | |
| 2007/0219960 A1 | | 9/2007 | Vadon et al. | |
| 2008/0015924 A1 | * | 1/2008 | Kalnicki | G06Q 10/00 705/7.31 |

OTHER PUBLICATIONS

Ozgrid.com Forum—Help Forums—Excel General-Market share formula. Forum posts dated Jul. 20, 2006-Jul. 21, 2006 Retrieved online from <<http://www.ozgrid.com/forum/showthread.php?t=54313>> on Jul. 22, 2016. 10 pages.*

(Continued)

*Primary Examiner* — Hajime Rojas
(74) *Attorney, Agent, or Firm* — Perkins Coie LLP

(57) ABSTRACT

A system and method for providing a user interface to facilitate the purchase of unique items by presenting past purchase information of unique items to consumers. The user interface is a two-dimensional chart, with each axis of the chart representing a variation of values of an attribute that characterize an item that was previously sold. The system populates the chart with sales data that reflects the past sales of items having attribute values that fall within the chart. By visually presenting to consumers the distribution of past purchases, the consumer is better able to assess whether an item that they are purchasing falls within "typical" purchase behavior of other consumers. In some embodiments, the system allows a user to select a region of the chart and initiate a search for items that are available for purchase that satisfy the attribute values that are associated with the selected region.

23 Claims, 8 Drawing Sheets

(56) References Cited

OTHER PUBLICATIONS

TechontheNet.com "Excel: Automatically highlight highest and lowest values in a range of cells" Nov. 29, 2006. Retrieved online from <<https://web.archive.org/web/20061129105908/http://www.techonthenet.com/excel/questions/cond_format3.php>> on Jul. 6, 2016. 4 pages.*

"Help Center," GeoCommons by Fortiusone, <http://noisy.fortiusone.net/drupal/?q=node/7#howdoiviewanalyze>, Internet Archive date: Aug. 31, 2007, 5 pages.

* cited by examiner

| Refine Search Criteria | | | | | | |
|---|---|---|---|---|---|---|
| Need Help? how to use search ——— Customize Search add/remove search criteria | Shape ☑Round ☐Princess ☐Emerald ☐Asscher ☐Marquise ☐Oval ☐Radiant ☐Pear ☐Heart ☐Cushion | Carat 1.23 0.74 | Cut Signature Ideal Ideal Very Good Good Fair | Color D E F G H I J | Clarity FL IF VVS1 VVS2 VS1 VS2 SI1 SI2 | Price $1,047,254 $324 |

| Your Search Results: 91 Round Diamonds | | | | | | | | |
|---|---|---|---|---|---|---|---|---|
| compare | Carat ▾ | Cut ▾ | Color ▾ | Clarity ▾ | Polish ▾ | Symmetry ▾ | Report ▾ | Price ▾ | Details |
| ☐ | 1.23 | Ideal | G | VS2 | EX | VG | GIA | $8,682 | view/select |
| ☐ | 1.23 | Ideal | G | VS2 | ID | ID | AGSL | $8,826 | view/select |
| ☐ | 1.22 | Ideal | G | VS2 | EX | EX | GIA | $8,493 | view/select |
| ☐ | 1.22 | Ideal | G | VS2 | EX | EX | GIA | $8,548 | view/select |
| ☐ | 1.21 | Ideal | G | VS2 | EX | EX | GIA | $8,497 | view/select |
| ☐ | 1.21 | Ideal | G | VS2 | EX | EX | GIA | $8,523 | view/select |
| ☐ | 1.21 | Ideal | G | VS2 | EX | EX | GIA | $9,137 | view/select |
| ☐ | 1.21 | Ideal | G | VS2 | ID | ID | AGSL | $9,201 | view/select |
| ☐ | 1.20 | Ideal | G | VS2 | ID | ID | AGSL | $8,428 | view/select |
| ☐ | 1.20 | Ideal | G | VS2 | EX | VG | GIA | $8,439 | view/select |
| ☐ | 1.20 | Ideal | G | VS2 | ID | ID | AGSL | $8,506 | view/select |
| ☐ | 1.17 | Ideal | G | VS2 | ID | ID | AGSL | $8,021 | view/select |
| ☐ | 1.14 | Ideal | G | VS2 | VG | VG | GIA | $7,243 | view/select |
| ☐ | 1.14 | Ideal | G | VS2 | VG | EX | GIA | $7,243 | view/select |
| ☐ | 1.14 | Ideal | G | VS2 | EX | EX | GIA | $8,830 | view/select |
| ☐ | 1.13 | Ideal | G | VS2 | EX | EX | GIA | $7,135 | view/select |
| compare | | | | | | | | |

*FIG. 8*

USER INTERFACE FOR DISPLAYING PURCHASE CONCENTRATION DATA FOR UNIQUE ITEMS BASED ON CONSUMER-SPECIFIED CONSTRAINTS

RELATED APPLICATIONS

This application claims the benefit of U.S. Provisional Application No. 61/016,415 entitled "COMPUTER-GENERATED USER INTERFACE USING GRAPHICAL DISPLAY OF DISCRETE LEVELS ASSOCIATED WITH, FOR EXAMPLE, PURCHASE HISTORY DATA FOR GEMSTONES," filed on Dec. 21, 2007.

BACKGROUND

When a consumer of unique items, such as gemstones, antiques, used cars, art, and so on, is in the market to purchase an item, the consumer is typically looking for a certain item that has specific attributes desirable to the consumer. For example, in the case of gemstones, a consumer may be interested in purchasing a gemstone having a particular cut, size, color, clarity, shape, and price. Many unique items have a seemingly unlimited number of possible combinations of attributes. These unlimited combinations of attributes cause sellers of unique items to consolidate the items in large inventories or databases, in order to provide a large number of purchase options to consumers. By making the databases electronically available to consumers, such as over the Internet, sellers allow consumers to easily search through the databases to find the item that they would like to purchase.

While making databases available online has been a significant benefit to consumers, deciding which item or items to purchase can be daunting to a consumer given the large number of choices that are now available to the consumer. Making a purchase decision may be particularly challenging to novice or unknowledgeable consumers, who may be overwhelmed by the large number of choices that they are presented. Therefore, an interface providing information to help in selecting a subset of items to investigate further or purchase would have desirable utility.

In order to help consumers search through large databases of items and decide which items to purchase, online retailers have created tools to assist consumers. When consumers are shopping for a product, they often want to know what other customers have chosen. Knowing that other customers have made similar choices can make a customer feel more comfortable about their own choice and lower the barrier to purchase. Such purchase information has recently been made available when choosing between different product manufacturers or product models of non-unique items. For example, Amazon.com has a tool that shows a user that is looking at a particular product whether the majority of consumers purchase the particular product the user is looking at, or whether consumers typically purchase a different product. When looking at a Nikon Coolpix S550 camera, for example, the tool may indicate that 55% of the people who look at the Coolpix camera purchase the S550, but that 30% purchase a Nikon Coolpix L18 (another model) and 15% purchase a Canon model (another manufacturer). Such a comparison tool is not applicable in the area of unique items, however, as no two customers can purchase the same item.

The need exists for a system that overcomes the above problems, as well as one that provides additional benefits. Overall, the examples herein of some prior or related systems and their associated limitations are intended to be illustrative and not exclusive. Other limitations of existing or prior systems will become apparent to those of skill in the art upon reading the following Detailed Description.

BRIEF DESCRIPTION OF THE DRAWINGS

FIG. 8 is an example of a search user interface to show details after selecting a search option in FIG. 7.

Figure 1:
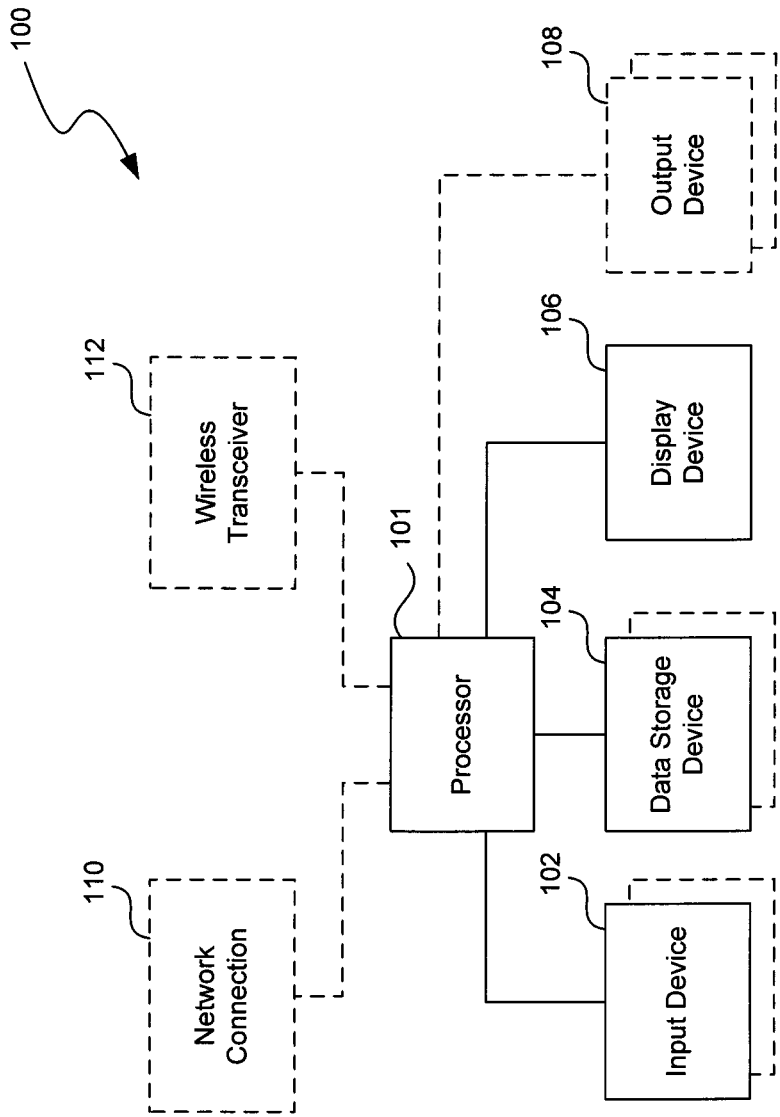
FIG. 1 is a block diagram of a basic and suitable computer that may employ aspects of the invention.

Note: the headings provided herein are for convenience and do not necessarily affect the scope or interpretation of the invention.

A portion of this disclosure contains material to which a claim for copyright is made. The copyright owner has no objection to the facsimile reproduction by anyone of the patent document or patent disclosure (including the Figures) as it appears in the Patent and Trademark Office patent file or records, but the copyright owner reserves all other copyright rights whatsoever.

DETAILED DESCRIPTION

A system and method is disclosed for providing a user interface to facilitate the purchase of unique items by presenting past purchase information of unique items to consumers. The user interface is in the form of a two-dimensional chart (referred to sometimes herein as a "heatmap"), with each axis of the chart representing a variation of values of an attribute that characterize an item that was sold. For example, when the unique items are gemstones, one axis of the chart may represent color of the gemstone and the other axis of the chart may represent clarity of the gemstone. The system populates the chart with sales data that reflects the past purchase of items having attribute values that fall within the chart. The chart may be colored, shaded, or include textual information to depict those regions having a greater past purchase popularity. By visually presenting to consumers the distribution of past purchases, the consumer is better able to assess whether an item that they are purchasing falls within "typical" purchase behavior of other consumers. When presented with such information, consumers are often able to more easily decide whether to purchase a particular unique item.

In some embodiments, the system and method allows a user to change the axes of the chart and select different attributes for display. In addition, the system may present a user with an option to change a scale range of the axes to focus on particular values of attributes that are of interest to the consumer. In addition, the system may allow a user to specify values of still other attributes to limit the past item purchases that are displayed on the chart. For example, in a system used for gemstones, the system may allow consumers to select or specify cuts, carat ranges, and/or price ranges, in order to further limit the displayed data of past purchases.

In some embodiments, the system and method allows a user to select a region of the chart and initiate a search for items that are available for purchase that satisfy the attribute values that are associated with the selected region. For example, the chart may be divided into a grid of elements. When a consumer hovers over one of the elements, the system generates a "find similar" popup that allows the consumer to be taken directly to a search engine for finding items having attribute values associated with the selected element. When applied to gemstones, for example, the attribute values may define an appropriate color and clarity values that are of interest to the consumer.

The system and method assists a consumer in searching through a large inventory or database of items, such as gemstones, antiques, used cars, art, as well as other less unique items, such as consumer electronics, clothing/shoes, etc. The system provides consumers with information regarding buying patterns based on one or more attributes. For gemstones, such attributes may include standard ones (e.g., cut, size, color, clarity, shape, and price) as well as other characteristics (e.g., depth percentage, table percentage, polish, length-to-width ratio, symmetry, florescence, etc.).

Various embodiments of the invention will now be described. The following description provides specific details for a thorough understanding and enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

FIG. 1 and the following discussion provide a brief, general description of a suitable computing environment in which aspects of the invention can be implemented. Although not required, aspects and embodiments of the invention will be described in the general context of computer-executable instructions, such as routines executed by a general-purpose computer, e.g., a server or personal computer. Those skilled in the relevant art will appreciate that the invention can be practiced with other computer system configurations, including Internet appliances, hand-held devices, wearable computers, cellular or mobile phones, multi-processor systems, microprocessor-based or programmable consumer electronics, set-top boxes, network PCs, mini-computers, mainframe computers and the like. The invention can be embodied in a special purpose computer or data processor that is specifically programmed, configured or constructed to perform one or more of the computer-executable instructions explained in detail below. Indeed, the term "computer", as used generally herein, refers to any of the above devices, as well as any data processor.

The invention can also be practiced in distributed computing environments, where tasks or modules are performed by remote processing devices, which are linked through a communications network, such as a Local Area Network ("LAN"), Wide Area Network ("WAN") or the Internet. In a distributed computing environment, program modules or sub-routines may be located in both local and remote memory storage devices. Aspects of the invention described below may be stored or distributed on computer-readable media, including magnetic and optically readable and removable computer discs, stored as firmware in chips (e.g., EEPROM chips), as well as distributed electronically over the Internet or over other networks (including wireless networks). Those skilled in the relevant art will recognize that portions of the invention may reside on a server computer, while corresponding portions reside on a client computer. Data structures and transmission of data particular to aspects of the invention are also encompassed within the scope of the invention.

Referring to FIG. 1, one embodiment of the invention employs a computer 100, such as a personal computer or workstation, having one or more processors 101 coupled to one or more user input devices 102 and data storage devices 104. The computer is also coupled to at least one output device such as a display device 106 and one or more optional additional output devices 108 (e.g., printer, plotter, speakers, tactile or olfactory output devices, etc.). The computer may be coupled to external computers, such as via an optional network connection 110, a wireless transceiver 112, or both.

The input devices 102 may include a keyboard and/or a pointing device such as a mouse. Other input devices are possible such as a microphone, joystick, pen, game pad, scanner, digital camera, video camera, and the like. The data storage devices 104 may include any type of computer-readable media that can store data accessible by the computer 100, such as magnetic hard and floppy disk drives, optical disk drives, magnetic cassettes, tape drives, flash memory cards, digital video disks (DVDs), Bernoulli cartridges, RAMs, ROMs, smart cards, etc. Indeed, any medium for storing or transmitting computer-readable instructions and data may be employed, including a connection port to or node on a network such as a local area network (LAN), wide area network (WAN) or the Internet (not shown in FIG. 1).

Figure 2A:
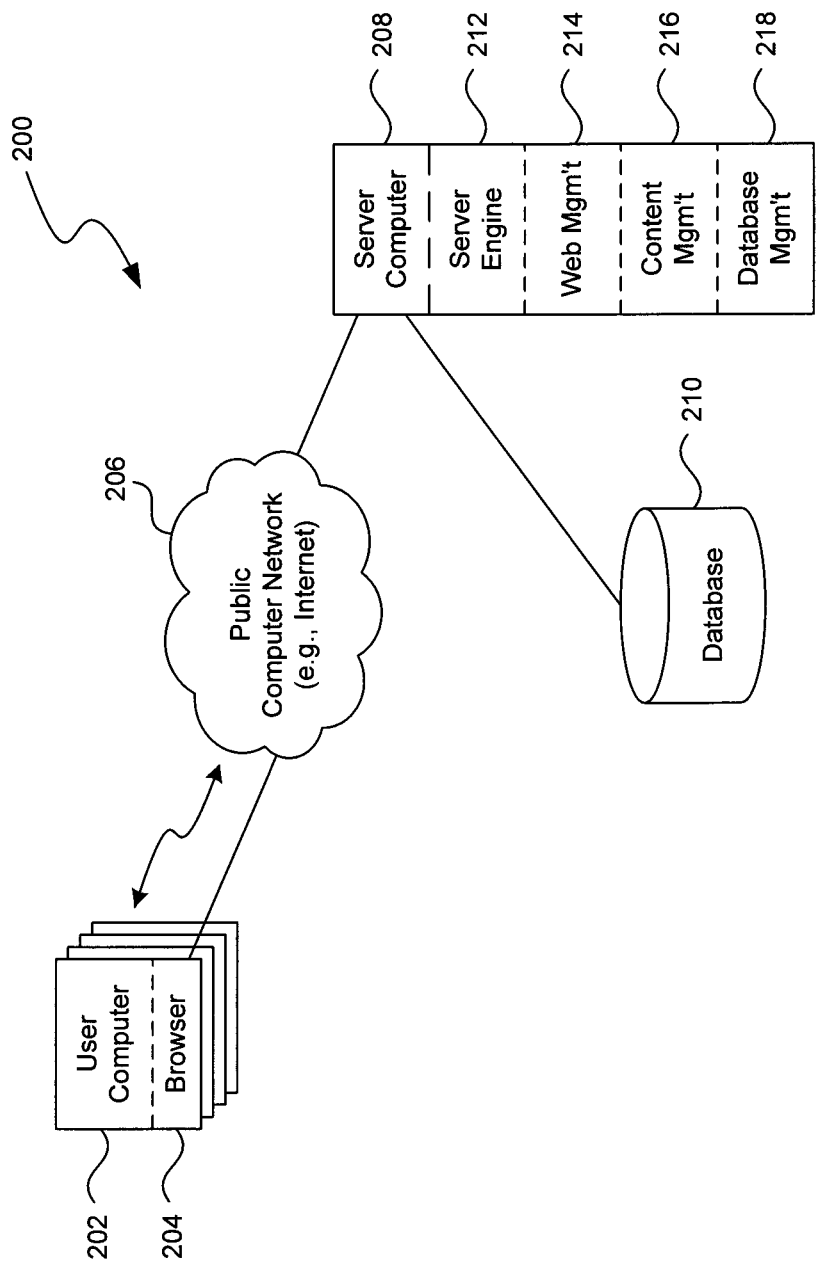
FIG. 2A is a block diagram illustrating a simple, yet suitable system in which aspects of the invention may operate in a networked computer environment.

Aspects of the invention may be practiced in a variety of other computing environments. For example, referring to FIG. 2A, a distributed computing environment with a web interface includes one or more user computers 202 in a system 200 are shown, each of which includes a browser program module 204 that permits the computer to access and exchange data with the Internet 206, including web sites within the World Wide Web portion of the Internet. The user computers may be substantially similar to the computer described above with respect to FIG. 1. User computers may include other program modules such as an operating system, one or more application programs (e.g., word processing or spread sheet applications), and the like. The computers may be general-purpose devices that can be programmed to run various types of applications, or they may be single-purpose devices optimized or limited to a particular function or class of functions. More importantly, while shown with web browsers, any application program for providing a graphical user interface to consumers may be employed, as described in detail below; the use of a web browser and web interface are only used as a familiar example here.

At least one server computer 208, coupled to the Internet or World Wide Web ("Web") 206, performs much or all of the functions for receiving, routing and storing of electronic messages, such as web pages, audio signals, and electronic images. While the Internet is shown, a private network, such as an intranet may indeed be preferred in some applications. The network may have a client-server architecture, in which a computer is dedicated to serving other client computers, or it may have other architectures such as a peer-to-peer, in which one or more computers serve simultaneously as servers and clients. A database 210 or databases, coupled to the server computer(s), stores much of the web pages and content exchanged between the user computers. The server computer(s), including the database(s), may employ security measures to inhibit malicious attacks on the system, and to preserve integrity of the messages and data stored therein (e.g., firewall systems, secure socket layers (SSL), password protection schemes, encryption, and the like).

The server computer 208 may include a server engine 212, a web page management component 214, a content management component 216 and a database management component 218. The server engine performs basic processing and operating system level tasks. The web page management component handles creation and display or routing of web pages. Consumers may access the server computer by means of a URL associated therewith. The content management component handles most of the functions in the embodiments described herein. The database management component includes storage and retrieval tasks with respect to the database, queries to the database, and storage of data such as video, graphics and audio signals and storage of data such as textual data, video, graphics and audio signals.

Figure 2B:
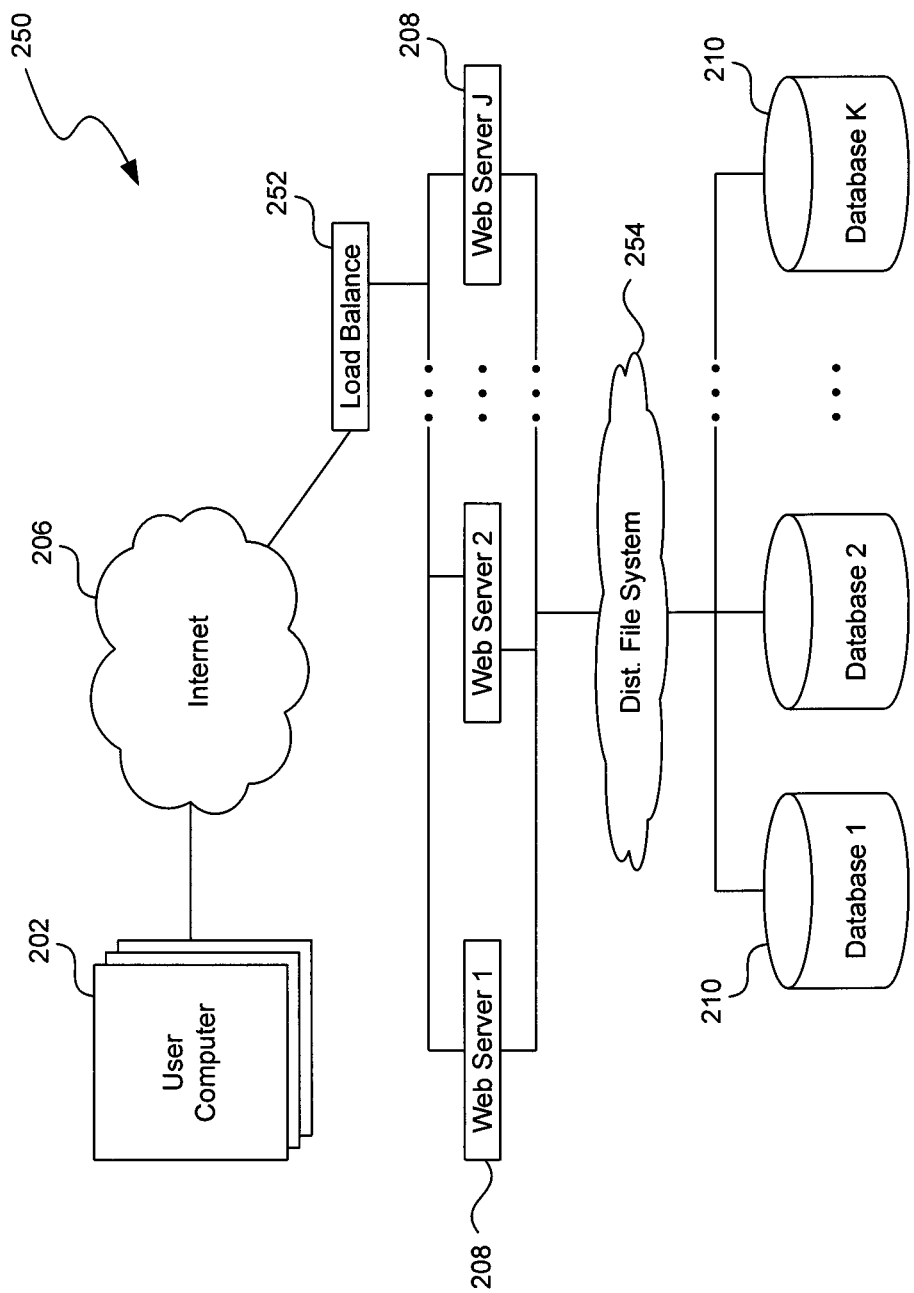
FIG. 2B is a block diagram illustrating an alternative system to that of FIG. 2A.

Referring to FIG. 2B, an alternative embodiment to the system 200 is shown as a system 250. The system 250 is substantially similar to the system 200, but includes more than one server computer (shown as server computers 1, 2, . . . J). A load balancing system 252 balances load on the several server computers. Load balancing is a technique well-known in the art for distributing the processing load between two or more computers, to thereby more efficiently process instructions and route data. Such a load balancer can distribute message traffic, particularly during peak traffic times.

A distributed file system 254 couples the web servers to one or more databases (shown as databases 1, 2 . . . K). A distributed file system is a type of file system in which the file system itself manages and transparently locates pieces of information (e.g., content pages) from remote files or databases and distributed files across the network, such as a LAN. The distributed file system also manages read and write functions to the databases.

Figure 5:
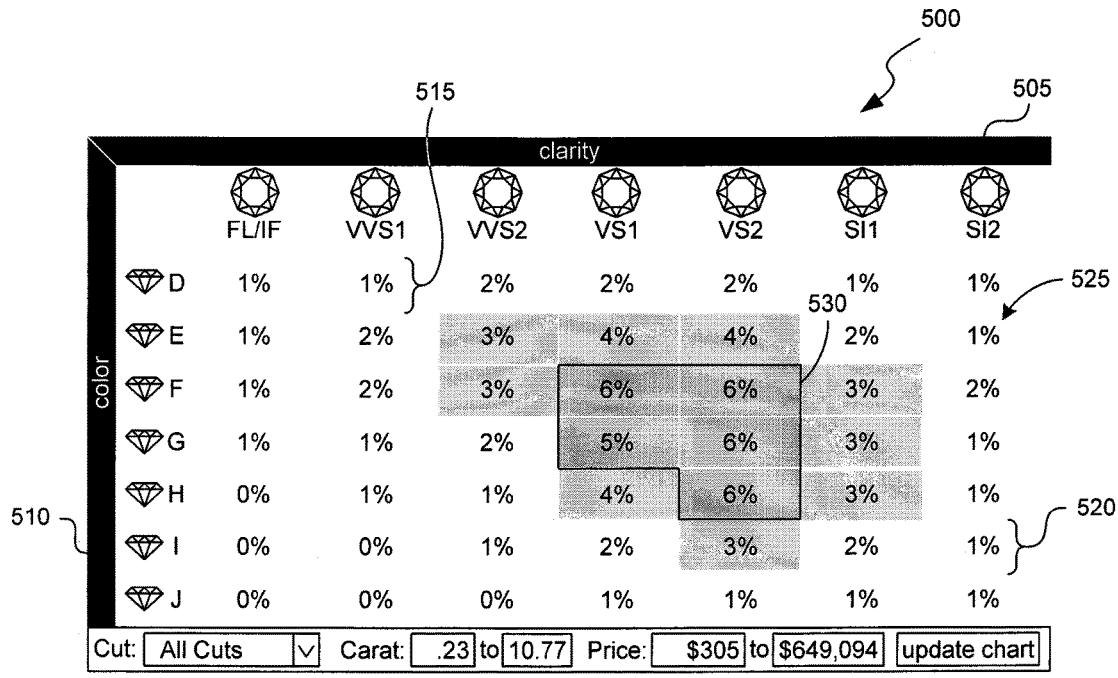
FIG. 5 is an example of a user interface to present past purchase information of unique items to consumers.

FIG. 5 is a representative user interface 500 that is generated by the system to depict past purchase information of unique items in order to help consumers make a current purchase decision. The user interface 500 depicted in FIG. 5 is directed to selling gemstones, and in particular diamonds, but as will be discussed in additional detail herein the interface is equally applicable to presenting information for any unique items that have two or more attributes that vary in value. The interface has two axes that are associated with attributes of the item. A horizontal axis 505 in the depicted example represents the various values of a "clarity" attribute of a diamond, namely FL/IF, WS1, WS2, VS1, VS2, SI1, and SI2. A vertical axis 510 represents the various values of a "color" attribute of a diamond, namely D, E, F, G, H, I, and J. The discrete values of each attribute create a grid of elements, each chart element being associated with items having the corresponding attribute values. For example, an element 515 represents diamonds having a clarity of WS1 and a color of D. As another example, an element 520 represents diamonds having a clarity of SI2 and a color of I. As will be described in additional detail herein, the system analyses past sales data and populates the interface 500 with data reflecting the sales of items having the corresponding attribute values. The data reflecting past sales may, in most circumstances, be interpreted as the "popularity" of the corresponding attribute values among the consumers reflected by the sales data. In the depicted example, the system has visually presented the sales data in two different ways. The system has populated each element with a percentage number 525 that represents the number of items sold having attribute values that fall within the range reflected by the element as a percentage of all items sold (as reflected in the sales data). For example, the VS1/G element indicates that 5% of the diamonds that were sold had that particular clarity/color combination. As another example, the WS2/I element indicates that only 1% of the diamonds that were sold had that particular clarity/color combination. In addition to displaying percentages, the system also has provided shading and/or color coding showing those percentages that exceed a certain threshold or satisfy a certain clustering algorithm. For example, elements 530 are highlighted in a darker color since all of the percentages in those elements exceed 5%. The presence of such a cluster indicates that the corresponding elements represent the most popular combination of attributes for items in the specified range.

Figure 3:
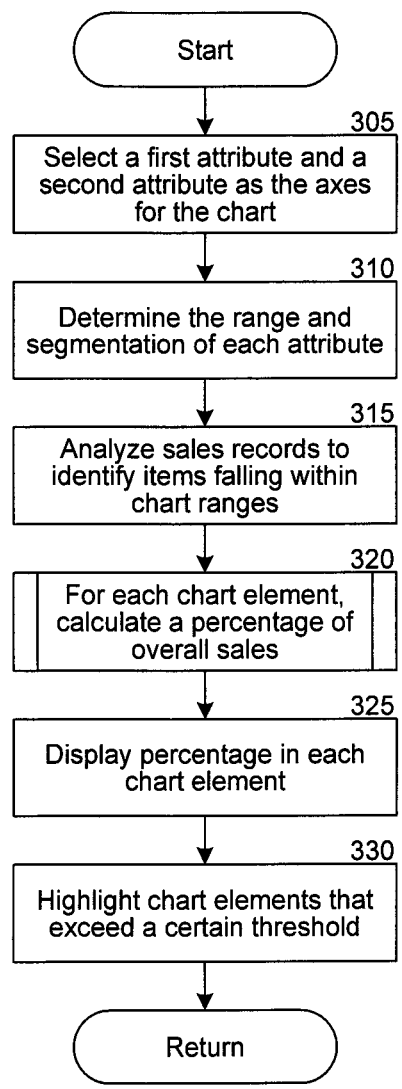
FIG. 3 is a flow chart of a process performed by the system to generate a user interface to present past purchase information of unique items to consumers.

FIG. 3 is a flow chart of a process 300 performed by the system to generate a user interface to facilitate the purchase of unique items by presenting past purchase information of unique items to consumers, such as the interface depicted in FIG. 5. At a block 305, the system initially determines the attributes that will be used as the axes of the user interface chart that is constructed by the system. The axes may be automatically selected by the system or may be manually selected by a consumer. In the depicted example, the clarity attribute and the color attribute have been selected for the chart axes by the system as being the greatest help to consumers. With respect to the sale of diamonds, such attributes are often the primary quality attributes that are considered by potential purchasers. In other situations and for other gemstones, different attributes may initially be selected by the system.

At a block 310, the system determines a range and a segmentation of the range for each attribute. In certain circumstances, industry-standard segmentation may be used by the system. For example, as depicted in FIG. 5, the clarity attribute is typically segmented into FL/IF, WS1, WS2, VS1, VS2, SI1, and SI2 buckets, and the color attribute is typically segmented into D, E, F, G, H, I, and J buckets. If the system were to select an attribute that did not have an industry-standard range or segmentation, however, the system or the consumer may define the range or segmentation. Using price as an example, the system or a consumer may define the segmentation to be "less than $1,000", "between $1,000 and $5,000", and "over $5,000." The system may automatically determine a range and segmentation, or may allow a consumer to manually specify the range and segmentation. When allow a consumer to manually specify a range and segmentation of the attribute, the system may allow the user to specify the range and segmentation before the generation of the chart or to modify the displayed range and segmentation after the chart has been presented.

At a block 315, the system analyzes sales records to identify those previous item sales that fall within the attribute ranges that are specified in the chart. Depending on the range of each attribute and the size of the item sales database, the number of past sales that are identified by the system may range from zero to a significant number. In the example depicted in FIG. 5, because the range of each attribute covers the entire range typically applied to diamonds, all past sales information of any diamond would be taken into account by the system when constructing the chart.

At a block 320, the system determines a percent of sales within each element in the chart. Each element is defined by an attribute segment from each axis. For example, an element 515 represents diamonds having a clarity of WS1 and a color of D. The system calculates the percent of sales for a chart element by determining the number of item sales that fall within that element, and dividing by a total number of item sales that are used by the system to construct the chart. For example, if three items sales were associated with a particular chart element, and if one-hundred fifty total sales were analyzed to construct the chart, the system would calculate a percentage of 2% for that chart element.

At a block 325, the system generates a chart (chart being broadly characterized to include a graph or other diagram) and displays the calculated percentage within each element of the chart. The percentage may be rounded to the nearest whole number, or one or more decimal places may be used to display each percentage. At a block 330, the system also analyzes all chart percentages and highlights those percentages that exceed a certain threshold. Although a consumer is able to determine which attribute values are the most common values for purchased items by reviewing the numerical percentages, applying shading or color coding to chart elements allows a consumer to more quickly focus on those areas of past demand. The threshold may be a fixed amount for each chart (e.g., any percentage that exceeds 5%) or may be varied depending on the distribution of percentages (e.g., the system may only highlight the top 10 elements within each chart). By showing the past purchase percentages to consumers in both text and graphics, consumers are often able to quickly arrive at a purchase decision for a new item by comparing the characteristics of the new item with what is considered "typical" across a population of consumers.

Figure 4:
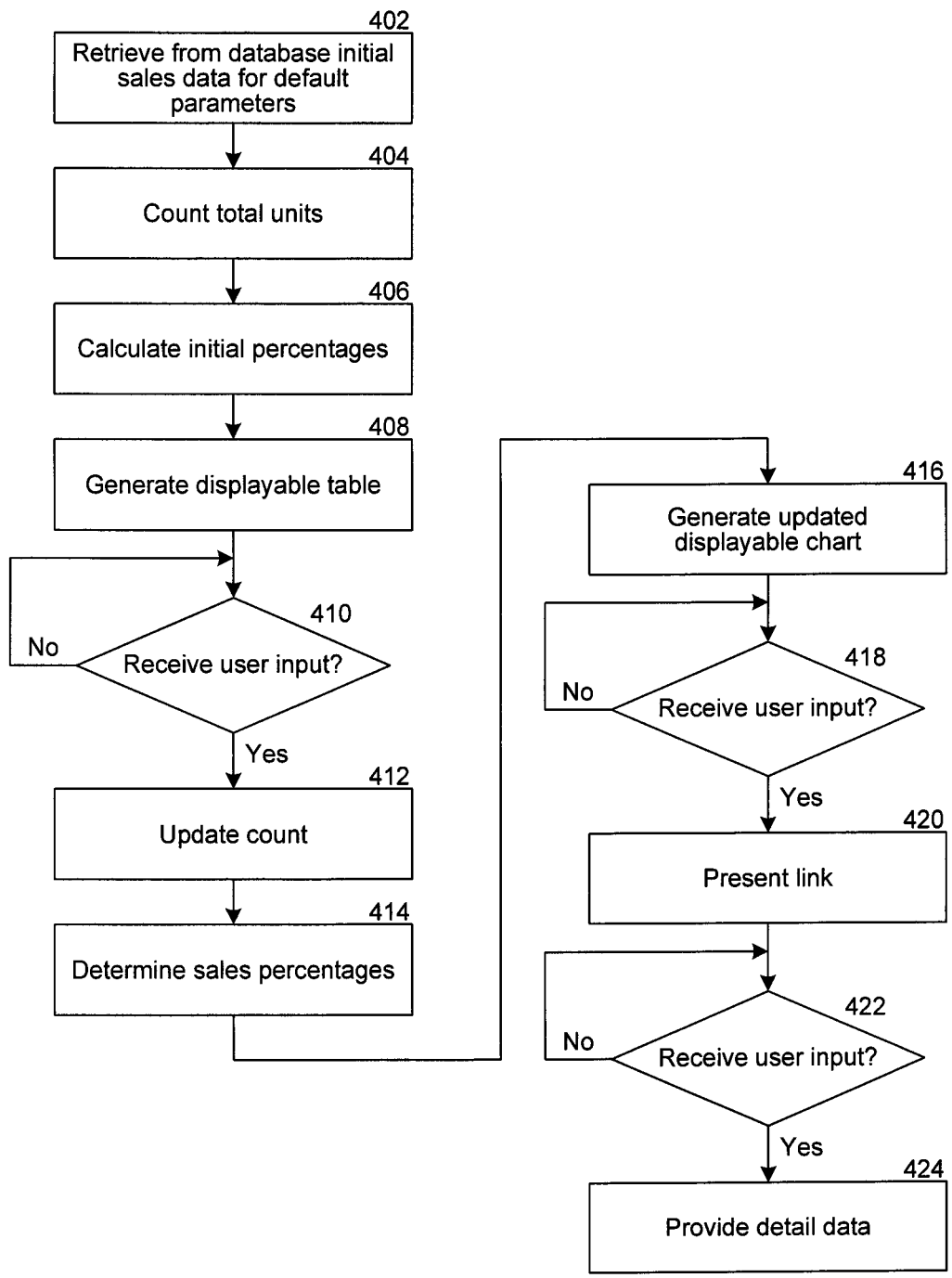
FIG. 4 is a flow chart of a process performed by the system to allow a user to modify the past purchase information that is presented in the user interface generated by the process of FIG. 3.

FIG. 4 is a flow chart of a process 400 performed by the system to allow a user to modify the past purchase information that is presented in the user interface, such as that depicted in FIG. 5. The depicted example uses a client-server model where a consumer computer having a browser initially sends a request to the server to search for diamonds. (While the term "diamond" is often used herein, the interface may apply to the searching of any gemstone or other unique item.) The server responds with content and code that contains the client representation of the displayable data and user-adjustable constraints discussed herein. The client or server may process some or all information necessary, although in most cases the server performs most acts. The depicted example also uses round diamonds. This criterion may indicate that a search or database query should be restricted to round diamonds available in the US, to all diamonds available at a desired date, and so on. Any possible search criteria may be used as initial criteria. Some or all of the initial criteria may be modifiable by the end consumer.

Blocks 402 through 408 in process 400 replicate the construction and display of a chart of past purchase information by the system, as was described in FIG. 3. At a block 402, the system retrieves sales data for all past items that fall within the attribute ranges of the chart. For example, the system may retrieve sales data for all round diamonds sold loose or assembled into custom jewelry, having a color between D and J inclusive, and a clarity between FL and SI2 inclusive. At blocks 404 and 406, the system counts the total units sold for each combination of attribute and calculates the percentage of the total sales for each chart element. At a block 408, the system generates and presents a two-dimensional chart indicating concentration of sales for each attribute segment (i.e., each quantized group or bucket), both as a numeric percent of the total as well as using color intensity that correlates to the percentage. The higher the percentage the darker the color. Other visual indicia may be provided, such as differing patterns, changes in color intensity, changes in color, changes in half-tone, etc. FIG. 5 is a representative user interface which displays the past purchase information to a consumer.

Note that FIGS. 5 through 8 are representative computer displays or web pages with respect to searching, presenting results, etc. These screens may be implemented in a variety of ways. The screens or web pages provide facilities to receive input data, such as fields to be filled in, pull-down menus or entries allowing one or more of several options to be selected, buttons, sliders, check boxes, hypertext links or other known user interface tools for receiving user input. While certain ways of displaying information to users, or receiving input from users, is shown and described with respect to certain Figures, those skilled in the relevant art will recognize that various other alternatives may be employed. The terms "screen," "web page" and "page" are generally used interchangeably herein. Although FIGS. 5 through 8 are presented with respect to a gemstone search interface, aspects of the invention may be used with other items, such as any other item having rare or unique qualities.

When implemented as web pages, the screens are stored as display descriptions, graphical user interfaces, or other methods of depicting information on a computer screen (e.g., commands, links, fonts, colors, layout, sizes and relative positions, and the like), where the layout and information or content to be displayed on the page is stored in a database. In general, a "link" refers to any resource locator identifying a resource on a network, such as a display description provided by an organization having a site or node on the network. A "display description," as generally used herein, refers to any method of automatically displaying information on a computer screen in any of the above-noted formats, as well as other formats, such as email or character/code-based formats, algorithm-based formats (e.g., vector generated), or matrix or bit-mapped formats. While aspects of the invention are described herein using a networked environment, some or all features may be implemented within a single-computer environment.

Figure 6:
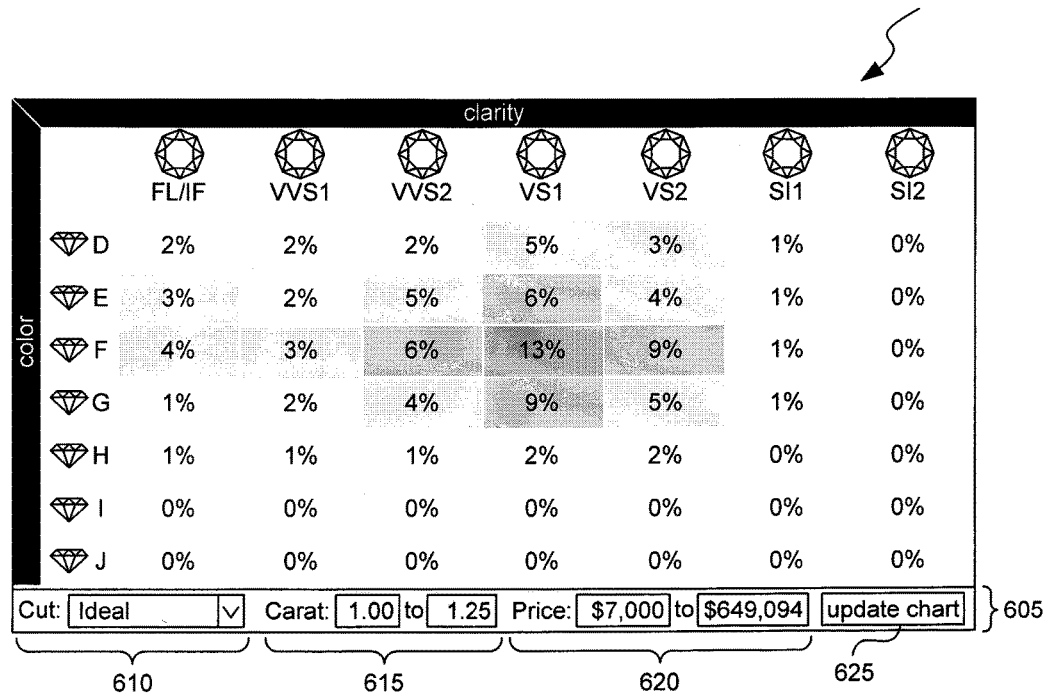
FIG. 6 is an example of user-controllable constraints modified for the user interface of FIG. 5.

Returning to FIG. 4, at blocks 410-416 the system allows a consumer to refine the sales data that is used to construct and populate the chart. By refining the sales data that is utilized by the system, a consumer is able to better focus on a particular range of attributes for an item that they are considering purchasing. FIG. 6 depicts a user interface 600 that allows a consumer to refine the displayed sales data. In FIG. 6, a refinement bar 605 is provided at the bottom of the displayed chart. The refinement bar 605 presents several controls that allow the user to select and apply one or more filters to the sales data that is used by the system to construct the chart. Choices presented in the refinement bar 605 shown at the bottom of FIG. 6 include:

A dropdown menu 610 allows a consumer to select a particular cut for the displayed diamonds. For example, the consumer may select from a list comprising: Signature Ideal, Ideal, Very Good, Good, and Fair.

A first range input area 615 allows a consumer to enter a low value and a high value for a carat weight of the displayed diamonds. The low value and the high value may be specified with up to two decimal places of precision, and define a range of carat weights that is used by the system when constructing the chart.

A second range input area 620 allows a consumer to enter a low value and a high value of a price of the displayed diamonds. The price may be entered in rounded units of dollars or in any other appropriate currency that is utilized by the system (e.g., Yen, Euros).

After operating one or more of the controls in the refinement bar 605, the consumer may select an "update chart" button 625 to have the system apply the entered filters to the displayed chart. Of course, those skilled in the art will appreciate that alternative or additional constraints may be provided other than the three depicted constraints. In the depicted example, as compared with initial ranges depicted in FIG. 5, the consumer has changed the carat value to 1.00 to 1.25, and the price to a minimum of $7,000 (the maximum price has remained). While FIG. 6 shows text input boxes, other user input elements may be provided. Any user interface component may include an indicator of what criteria is to be refined, and a method by which the consumer may indicate a criteria value, set of values, or range of values.

In one implementation specifically for diamonds, the constraints can include: price, shape, cut grade (cut), color grade (color), clarity grade (clarity), carat weight (carat), depth percent, table percent, crown angle percent, crown height percent, pavilion angle, pavilion depth, star length, lower half percent, length, width, height, length/width ratio, finish, polish, symmetry, fluorescence, girdle description, girdle quality, min girdle size, max girdle size, girdle facet, culet, certificate lab(s), certificate id, comments from certificate, certification type, other comments, existence of scanned certificate, availability set or loose, arrival date set or loose, ship date set or loose, time listed on site, crown, pavilion, compatibility with jewelry for mounting purposes, branding information, consumer or other favorites, consumer or other ranking, consumer or other rating, popularity of consumers, visibility of hearts and arrows, existence of or contents of inscription, location of inclusions or flaws, ability to reflect light, and ratios or relationships of any of the attributes.

In addition to constraints that are associated with the item, the system may allow the consumer to select one or more constraints that are associated with the population of purchasers. For example, the consumer may be interested in only purchases that were made during a certain timeframe (e.g., within the past year), only purchases made by men or by women, only purchases made by consumers that meet a certain demographic (e.g., income, state of residence). The system may therefore provide other options to allow a consumer to refine the displayed sales data in a manner that would be helpful to the consumer.

In some cases, the criteria displayed or input by a consumer may have two distinct boundary values or sets of boundary values. The outer boundary values are those values that constrain the range of a refinement user interface control to a limited range that may be equal to or less than the range of the entire data set to be searched. The inner boundary values are those values that are used to define the search criteria itself. By definition, the inner boundary values must lie within the outer boundary values such that min (inner values)>=min (outer values) and max (inner values)<=max (outer values). This allows the consumer to set outer boundary values to less than the boundaries of the entire data set, providing controls with a greater sensitivity. The inner boundaries may be controlled by the positions of the control elements and the outer boundaries may be controlled by initial settings and/or enterable text boxes. The system may also permit a consumer to reset the outer boundary values to match the range of the entire data set.

After selection of the "update chart" button 625, the consumer-input constraint or criteria may be passed in any format that provides enough information for the server to understand how to limit the display, search or database query. The server interprets the request and then initiates a request for the information. Such information may reside on the same server computer or another server. During this time the system may choose to display a visual indicator to the consumer that the request for information is in process. The information is then sent to the client computer, along with any necessary supporting information such as total diamond count, where the information is rendered in such a way that the consumer can then view the diamond information.

1) Alternatively the first set of data could have been returned as a result of the initial request.
2) Instead of passing all the search criteria with each request, some or all of the request criteria may be stored on a server computer.
3) Instead of passing all the search criteria with each request, some or all of the request criteria may be stored in a cookie.

Returning to FIG. 4, at a decision block 410 the system receives consumer input via the refinement bar that is intended to restrict the displayed data to better reflect a purchase that is being considered by the consumer. At blocks 412-416, the system updates the displayed chart by filtering the sales data using the filters that have been entered by the consumer. At block 412, the system re-counts a total number of units sold for each combination of color and clarity within the set of sales data as further limited by the filter settings. At block 414, the system determines a percent of sales within each attribute bucket. At block 416, the system generates and presents to the consumer an updated chart indicating relative sales for each element. The presented chart will contain a subset of all sales data, since the filters applied by the consumer reduce the data that is analyzed by the system.

At blocks 418-424, the system allows a consumer to select one or more elements within the chart and initiate a search for items that are available for purchase and which are similar to previously-sold items that are reflected by the selected elements. At a block 418, once the consumer decides on a specific color and clarity of interest, the consumer can select the representative area of the chart for that combination of color and clarity. An area of the chart may be selected by hovering a cursor over a chart element, by clicking on and dragging the cursor over one or more chart elements, or using any other common user-interface selection methods.

Figure 7:
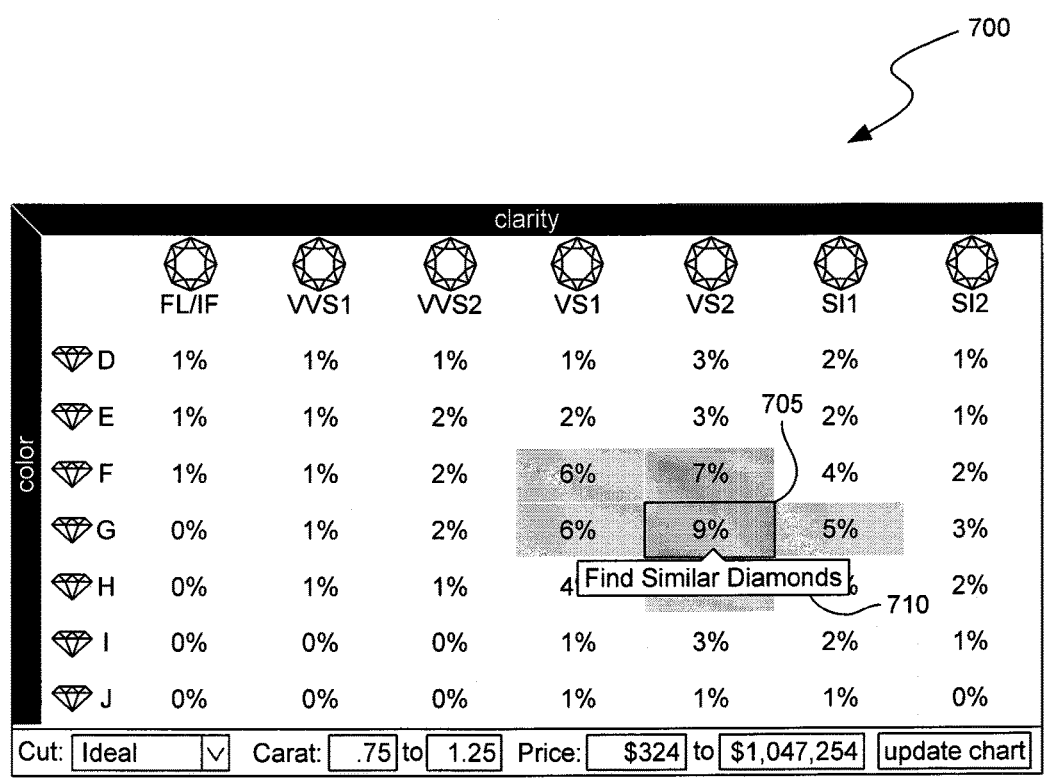
FIG. 7 is an example of an alternative or additional user interface to enable a consumer to search for available items to purchase having selected attributes.

At a block 420, the system dynamically presents a link to search for items that are available for purchase and which satisfy the selected attribute values. For example, FIG. 7 depicts a user interface 600 where a consumer has selected an element 705 as representing items of interest. In response to the consumer's selection of the element, the system has generated a pop-up box 710 containing a link that allows the consumer to "Find Similar Diamonds." By selecting the link, the consumer makes a request to the system to find diamonds that both match the color and clarity represented by the selected chart area as well satisfying any addition filter criteria of cut, carat, and price that the consumer may have specified in the refinement bar 605.

Returning to FIG. 4, in blocks 422-424, the system implements a search that is specified by a consumer. At a block 422, the system receives a click or user input on the link 710 or the chart area 705. (Rather than displaying a pop-up box with a link, the system may immediately perform a search when a consumer selects a particular element or area in the chart.) At a block 424, the system applies a search query containing the specified parameters to an item search engine or service. The results of the search query are then presented to the consumer. For example, as depicted in FIG. 8 the consumer may be presented with a list of diamonds that meet the criteria specified in the refinement bar as well as the color and clarity of the selected chart area. The display of FIG. 8 may include an interface that consists of user interface elements to allow the consumer to choose gemstone attributes, ranges of gemstone attributes, or in any other way make a choice that affects the criteria used to constrain the set of gemstones found in a search. The gemstones may be displayed via a count of diamonds, a list of diamonds, or any combination of these or other methods. Other methods may include subjective restrictions or groupings such as "highest quality diamonds only" or an indication of what the diamond may be set in—such as a yellow gold ring. The search criteria interface may also be made up of individual search criteria components.

Various alternatives or additions to the features described above may be provided. For example, the interface may provide, following block 424, a suggestion of settings that may be used with one or more selected diamonds. The consumer could choose a setting first, and then the system may show diamonds appropriate for that setting. Alternatively or additionally, the system could provide displays of settings based on metal type or color to thereby search through and sort settings for appropriate gemstones. The system could remember previous settings or configurations so that if the consumer deselects or hides one display attribute user interface component, but then displays it again, it will be adjusted to the setting previously established by the consumer. Alternatively, the system can prompt the consumer to restore settings or configurations. The system may update some settings based on other changes, such as changes in the shape of a diamond. The system may automatically display updates when user input is received. Further, the system may display an optional reset button to reset all user interface components and displays to a default configuration.

The system may detect window sizing of a user's computer, and reconfigure the user interface based on the detected window size. Further, the system may include a maximize button that would show as many options as would fit on a detected window size.

This system may provide features to help consumers identify two or more matched gemstones. Alternatively, rather than displaying diamonds based on price, or even displaying any results, the system may first allow the consumer to adjust various criteria and then initiate a search for gemstones meeting those criteria.

Gemstones may be filtered based on other criteria, such as arrival date, eligibility to fit in different types of items (e.g., to fit within a three-stone ring), etc. The system further may provide groupings of similar shapes so that, for example, all rectangular cuts may be grouped together (e.g., all rectilinear shapes grouped together like princess, emerald, asscher, radiant and cushion cuts). Thus, preselected groups of shapes may be searched together.

CONCLUSION

In general, the detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

Aspects of the invention may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the invention reside on a server computer, while corresponding portions reside on a client computer such as a mobile or portable device, and thus, while certain hardware platforms are described herein, aspects of the invention are equally applicable to nodes on a network.

The teachings of the invention provided herein can be applied to other systems, not necessarily the system described herein. For example, while the various embodiments are described above with respect to a gemstone search interface, those embodiments may be implemented for searching one or more databases storing unique data such as on used cars, art, as well as other less unique items, such as consumer electronics, clothing/shoes, etc. The elements and acts of the various embodiments described herein can be combined to provide further embodiments.

These and other changes can be made to the invention in light of the above Detailed Description. While the above description describes certain embodiments of the invention, and describes the best mode contemplated, no matter how detailed the above appears in text, the invention can be practiced in many ways. Details of the system may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

I claim:

1. A computer-implemented method of generating an interface to enable consumers to assess historical sales of a gemstone, the computer-implemented method comprising:
    maintaining, by a computing system, sales data that reflects a plurality of gemstone sales, the sales data comprising, for each gemstone that was sold, values of two or more attributes that characterize the gemstone;
    selecting a first attribute and a second attribute from the two or more attributes that characterize a gemstone, the selected first and second attributes to be used as a basis to create a visualization of past gemstone sales;
    selecting a first range of attribute values corresponding to the first selected attribute and a second range of attribute values corresponding to the second selected attribute;
    receiving, by the computing system, a third range of attribute values selected by a consumer, the third range of attribute values corresponding to a third attribute that characterizes a gemstone;
    generating, by the computing system, a two-dimensional chart having the first selected attribute as a first axis with a scale encompassing the first range of attribute values and the second selected attribute as a second axis with a scale encompassing the second range of attribute values, each combination of attribute value on the first axis and attribute value on the second axis representing an element in the chart;
    analyzing, by the computing system, the sales data to identify a plurality of gemstones that were sold having values of attributes that fall within the first, second, and third selected ranges and to identify combinations of the first selected attribute value and the second selected attribute value that are associated with gemstones having a higher frequency of sales;
    displaying, by the computing system, an indication of the identified plurality of gemstones on the chart, the indication visually depicting aggregate past purchase behavior of gemstones having values of attributes that fall within the first, second, and third ranges by displaying a plurality of percentages representing frequency of sales of gemstones having combinations of the first, second, and third attributes, and by altering a visual appearance of a predetermined number of elements of the chart to differentiate particular elements from one another, wherein the alteration is based upon a relative magnitude of the displayed percentages representing frequency of sales;
    receiving a selection of a region including the altered elements of the chart; and
    in response to the selection of the region, generating, by the computing system, a control that allows the consumer to submit a search query to a search engine to access information about the gemstones identified by the selected region on the chart, the search query having values of attributes that fall within the first, second, and third ranges of the corresponding selected region.

2. The computer-implemented method of claim 1, wherein the first selected attribute is color and the second selected attribute is clarity.

3. The computer-implemented method of claim 1, wherein the first range and the second range encompass all gemstones contained in the sales data.

4. The computer-implemented method of claim 1, wherein the first range and the second range are selected by the consumer.

5. The computer-implemented method of claim 1, wherein the chart is comprised of rows and columns that form a grid of elements, each row in the grid representing a subset of the first range and each column of the grid representing a subset of the second range.

6. The computer-implemented method of claim 5, further comprising, for each element:
    analyzing the sales data to determine a number of gemstone sales having attribute values that fall within the subset of the first range and the subset of the second range of the associated element;
    dividing the determined number of gemstone sales that fall within the associated element by a total number of the plurality of gemstone sales in order to calculate the percentage frequency of sales of the gemstones for the associated element; and
    displaying the calculated percentage frequency of sales in the element.

7. The computer-implemented method of claim 1, wherein altering the visual appearance of a predetermined number of elements of the chart comprises shading the elements in a manner correlated with the displayed percentage frequency.

8. The computer-implemented method of claim 1, further comprising:
    receiving a user operation of the control; and
    in response to the user operation, presenting results of the search query to the consumer.

9. The computer-implemented method of claim 8, the method further comprising:
    receiving a user input adjusting at least one of the first, second or third ranges; and
    in response to the user input, updating the presented results of the search query to the consumer.

10. A non-transitory computer-readable storage medium encoded with instructions that, when executed by a processor, cause the processor to implement a method of generating an interface to enable consumers to assess historical sales of a gemstone, the method comprising:
    maintaining sales data, in a data storage device, that reflects a plurality of gemstone sales, the sales data comprising, for each gemstone that was sold, values of two or more attributes that characterize the gemstone;
    selecting a first attribute and a second attribute from the two or more attributes that characterize the gemstone, the selected first and second attributes to be used as a basis to create a visualization of the gemstone sales;
    selecting a first range of attribute values corresponding to the first selected attribute and a second range of attribute values corresponding to the second selected attribute;

receiving, via an input device, a third range of attribute values selected by a consumer, the third range of attribute values corresponding to a third attribute that characterizes a gemstone;

generating a two-dimensional chart having the first selected attribute as a first axis with a scale encompassing the first range of attribute values and the second selected attribute as a second axis with a scale encompassing the second range of attribute values, each combination of attribute value on the first axis and attribute value on the second axis representing an element in the chart;

analyzing the sales data to identify a plurality of gemstones that were sold having values of attributes that fall within the first, second, and third selected ranges and to identify combinations of the first selected attribute value and the second selected attribute value that are associated with gemstones having a higher frequency of sales;

displaying, via a display device, an indication of the identified plurality of gemstones on the chart, the indication visually depicting aggregate past purchase behavior of gemstones having values of attributes that fall within the first, second, and third ranges by displaying a plurality of percentages representing frequency of sales of gemstones having combinations of the first, second, and third attributes, and by altering a visual appearance of a predetermined number of elements of the chart to differentiate the elements from one another, wherein the alteration is based upon a relative magnitude of the displayed percentages representing frequency of sales;

receiving, via the input device, a selection of a region including the altered elements of the chart; and in response to the selection of the region, generating a control that allows the consumer to submit a search query to a search engine to access information about the gemstones identified by the selected region on the chart, the search query having values of attributes that fall within the first, second, and third ranges.

11. The non-transitory computer-readable storage medium of claim 10, wherein the first selected attribute is color and the second selected attribute is clarity.

12. The non-transitory computer-readable storage medium of claim 10, wherein the first range and the second range encompass all gemstones contained in the sales data.

13. The non-transitory computer-readable storage medium of claim 10, wherein the first range and the second range are selected by the consumer.

14. The non-transitory computer-readable storage medium of claim 10, wherein the chart is comprised of rows and columns that form a grid of elements, each row in the grid representing a subset of the first range and each column of the grid representing a subset of the second range.

15. The non-transitory computer-readable storage medium of claim 14, further comprising, for each element:
analyzing the sales data to determine a number of gemstone sales having attribute values that fall within the subset of the first range and the subset of the second range of the associated element;
dividing the determined number of gemstone sales that fall within the associated element by a total number of the plurality of gemstone sales in order to calculate the percentage frequency of sales of the gemstones for the associated element; and
displaying the calculated percentage frequency of sales in the element.

16. The non-transitory computer-readable storage medium of claim 10, wherein altering the visual appearance of a predetermined number of elements of the chart comprises shading the elements in a manner correlated with the displayed percentage frequency.

17. The computer-implemented method of claim 10, the method further comprising:
receiving a user operation of the control;
in response to the user operation, presenting results of the search query to the consumer;
receiving a user input adjusting at least one of the first, second or third ranges; and
in response to the user input, updating the presented results of the search query to the consumer.

18. A computing system for generating an interface to enable consumers to assess historical sales of a gemstone, the computing system comprising:
a data storage area that contains sales data reflecting a plurality of gemstone sales, the sales data comprising, for each gemstone that was sold, values of two or more attributes that characterize the gemstone; and
a processor coupled to the data storage area and having instructions that, when executed, cause the processor to:
select a first attribute and a second attribute from the two or more attributes that characterize a gemstone, the selected first and second attributes to be used as a basis to create a visualization of past gemstone sales;
select a first range of attribute values corresponding to the first selected attribute and a second range of attribute values corresponding to the second selected attribute;
receive a third range of attribute values selected by a consumer, the third range of attribute values corresponding to a third attribute that characterizes a gemstone;
generate a two-dimensional chart having the first selected attribute as a first axis with a scale encompassing the first range of attribute values and the second selected attribute as a second axis with a scale encompassing the second range of attribute values, each combination of attribute value on the first axis and attribute value on the second axis representing an element in the chart;
analyze the sales data to identify a plurality of gemstones that were sold having values of attributes that fall within the first, second, and third selected ranges and to identify combinations of the first selected attribute value and the second selected attribute value that are associated with gemstones having a higher frequency of sale;
cause an indication of the identified plurality of gemstones to be displayed on the chart, the indication visually depicting aggregate past purchase behavior of gemstones having values of attributes that fall within the first, second, and third ranges by displaying a plurality of percentages representing frequency of sales of gemstones having combinations of the first, second, and third attributes, and by altering a visual appearance of a predetermined number of elements of the chart to differentiate the elements from one another, wherein the alteration is based upon a relative magnitude of the displayed percentages representing frequency of sales;
receive from the consumer a selection of a region including the altered elements of the chart; and in response to the selection of the region, generate a control that allows the consumer to submit a search query to a search engine to access information about the gemstones identified by the selected region on the chart, the search query having values of attributes that fall within the first, second, and third ranges.

19. The system of claim 18, wherein the first selected attribute is color and the second selected attribute is clarity.

20. The system of claim 18, wherein the first range and the second range encompass all gemstones contained in the sales data.

21. The system of claim 18, wherein the first range and second range are selected by the consumer.

22. The system of claim 18, wherein the chart is comprised of rows and columns that form a grid of elements, each row in the grid representing a subset of the first range and each column of the grid representing a subset of the second range.

23. The system of claim 22, wherein the instructions, when executed, further cause the processor to:
- analyze the sales data to determine a number of gemstone sales having attribute values that fall within the subset of the first range and the subset of the second range of the associated element;
- divide the determined number of gemstone sales that fall within the associated element by a total number of the plurality of gemstone sales in order to calculate the percentage frequency of sales of the gemstones for the associated element; and
- display the calculated percentage frequency of sales in the element.

* * * * *